(12) United States Patent
Manacorda et al.

(10) Patent No.: US 11,953,587 B2
(45) Date of Patent: Apr. 9, 2024

(54) METHOD FOR GROUND PENETRATING RADAR DETECTIONS AND APPARATUS THEREOF

(71) Applicant: IDS GEORADAR S.R.L., Milan (IT)

(72) Inventors: Guido Manacorda, Pisa (IT); Mario Miniati, Leghorn (IT); Davide Pasculli, Leghorn (IT); Alessandro Simi, Leghorn (IT)

(73) Assignee: IDS GEORADAR S.R.L., Milan (IT)

( * ) Notice: Subject to any disclaimer, the term of this patent is extended or adjusted under 35 U.S.C. 154(b) by 623 days.

(21) Appl. No.: 16/607,336

(22) PCT Filed: May 2, 2018

(86) PCT No.: PCT/IB2018/053051
§ 371 (c)(1),
(2) Date: Oct. 22, 2019

(87) PCT Pub. No.: WO2018/203259
PCT Pub. Date: Nov. 8, 2018

(65) Prior Publication Data
US 2020/0393556 A1    Dec. 17, 2020

(30) Foreign Application Priority Data
May 2, 2017    (IT) .......... 102017000047233

(51) Int. Cl.
*G01S 13/88* (2006.01)
*G01S 17/48* (2006.01)

(52) U.S. Cl.
CPC ........... *G01S 13/885* (2013.01); *G01S 17/48* (2013.01)

(58) Field of Classification Search
CPC ............... G01S 13/885; G01S 17/48
(Continued)

(56) References Cited

U.S. PATENT DOCUMENTS

| 4,148,026 A * | 4/1979 | Gendreu | .............. F41G 5/14 |
| | | | 250/203.1 |
| 4,224,507 A * | 9/1980 | Gendreu | ............. G01S 13/66 |
| | | | 356/139.08 |

(Continued)

FOREIGN PATENT DOCUMENTS

| CA | 2866370 A1 * | 9/2013 | ............. A61B 34/20 |
| DE | 10 2011 120 153 A1 | 6/2013 | |

(Continued)

*Primary Examiner* — Nuzhat Pervin
(74) *Attorney, Agent, or Firm* — Maschoff Brennan (57) ABSTRACT

A method for detecting positions of objects under a surface with respect to a reference Cartesian system having axes x and y, includes prearranging a GPR apparatus that includes a distance detecting unit for measuring a distance with respect to a not transparent object, a control unit, and a center of reference having coordinates $x_c$ and $y_c$ on the reference Cartesian system. The method further includes prearranging a first linear wall having direction parallel to the axis x, handling the apparatus on the surface, detecting a first measurement of distance between the distance detecting unit and the first linear wall, calculating the coordinate $y_c$ of the center of reference, calculating a change of the coordinate $y_c$ during the step of handling, and associating a coordinate $y_i = y_{ci}$ to an i-th object detected, where $y_{ci}$ is value of the coordinate $y_c$ at the detection by a GPR sensor of the i-th object.

9 Claims, 4 Drawing Sheets

(58) Field of Classification Search
USPC .......................................................... 342/22
See application file for complete search history.

(56) References Cited

U.S. PATENT DOCUMENTS

| | | | | | |
|---|---|---|---|---|---|
| 5,778,548 | A * | 7/1998 | Cerruti | ................. | G01B 21/042 33/503 |
| 6,628,322 | B1 * | 9/2003 | Cerruti | ................. | G01B 11/005 348/136 |
| 7,683,821 | B1 * | 3/2010 | Clodfelter | ............... | F41H 11/16 342/22 |
| 8,037,759 | B2 * | 10/2011 | Peters | ...................... | G01P 7/00 701/504 |
| 8,306,747 | B1 * | 11/2012 | Gagarin | ................... | G01C 7/04 701/514 |
| 8,943,701 | B2 * | 2/2015 | Hayes | ................... | G01C 15/002 33/1 G |
| 9,160,980 | B2 * | 10/2015 | Garin | ................ | G01C 21/1656 |
| 9,411,066 | B1 * | 8/2016 | Olsson | ................... | G01V 3/104 |
| 10,228,437 | B2 * | 3/2019 | Roquel | ................ | G01S 5/0294 |
| 10,869,632 | B2 * | 12/2020 | Di Pardo | ................ | G06F 3/017 |
| 11,006,861 | B2 * | 5/2021 | Di Pardo | ................ | A61B 5/225 |
| 11,421,980 | B2 * | 8/2022 | Heymer | ................... | G01S 17/06 |
| 2003/0112170 | A1 * | 6/2003 | Doerksen | ................ | G01V 3/15 342/55 |
| 2003/0136249 | A1 * | 7/2003 | Inoue | ...................... | G01S 13/86 89/1.13 |
| 2006/0055584 | A1 * | 3/2006 | Waite | ..................... | G01V 11/00 342/55 |
| 2007/0109177 | A1 * | 5/2007 | Baath | ...................... | G01S 13/88 342/25 C |
| 2010/0052969 | A1 * | 3/2010 | Niktash | ................ | G01S 13/885 342/54 |
| 2014/0121964 | A1 * | 5/2014 | Stanley | .................. | G01C 21/30 701/514 |
| 2015/0285899 | A1 * | 10/2015 | Duvoisin, III | .......... | G01S 7/354 342/22 |
| 2016/0350907 | A1 * | 12/2016 | Simula | ................... | B60R 11/04 |
| 2018/0217251 | A1 * | 8/2018 | Stanley | ................ | G01S 13/89 |
| 2018/0299543 | A1 * | 10/2018 | Lomnitz | ................ | G01S 7/025 |
| 2019/0064362 | A1 * | 2/2019 | Scott | ..................... | G01S 13/865 |
| 2019/0154429 | A1 * | 5/2019 | Heymer | ................. | G01B 11/26 |
| 2021/0049543 | A1 * | 2/2021 | Jacobus | ................ | G05D 1/0274 |
| 2021/0080564 | A1 * | 3/2021 | Nikishov | ................ | H04N 5/76 |

FOREIGN PATENT DOCUMENTS

| | | | | |
|---|---|---|---|---|
| DE | 102011120153 B4 * | 2/2021 | ............. | G01S 13/86 |
| EP | 2031347 A1 * | 3/2009 | ......... | G01B 11/0616 |
| EP | 2208019 B1 * | 6/2013 | ............. | G01C 15/02 |
| JP | S61-93969 A | 5/1986 | | |
| JP | S-6193969 A * | 5/1986 | ......... | G01S 13/0209 |
| JP | S6193969 A * | 5/1986 | ............. | G01S 13/86 |
| WO | 2003/062860 A1 | 7/2003 | | |
| WO | WO-03062860 A1 * | 7/2003 | ............... | G01V 3/15 |

\* cited by examiner

METHOD FOR GROUND PENETRATING RADAR DETECTIONS AND APPARATUS THEREOF

FIELD OF THE INVENTION

The present invention relates to the field of investigations using GPR (Ground Penetrating Radar) technique for the identification of non-visible objects.

In particular, the invention relates to a method and a system for tracking the position of a GPR apparatus during the realization of this technique.

DESCRIPTION OF THE PRIOR ART

Inspection devices are known which use radio frequency energy for radar research of objects in the underground, in walls of buildings, or in other hidden sites, with various applications in the field of civil engineering, geology, archaeology. These devices have the advantage of not interfering with the physical, chemical and mechanical characteristics of the structures and the material that surround them.

Among such devices, known as georadar or with GPR (Ground Penetrating Radar) or SPR (Surface Penetrating Radar) acronyms, many provide at least one RF radio frequency receiver/emitting antenna (GPR sensor) and a remote control unit, usually comprising a computer and an interface card with the antenna/antennas. The principle of operation of these devices is that typical of the radar to emit a very short-duration RF signal (a few nanoseconds) and to process a return signal reflected by the objects invested by the emitted signal (echo). The GPR sensor is moved on the surface of the material to be investigated, and, once the transmission is started, the received return signals, suitably filtered, are generally displayed in the form of two-dimensional images, representing with an appropriate colour coding the amplitude versus time (ordinate) and space (abscissa).

Normally, the GPRs of the prior art used in the operations of identification and mapping of objects immersed in materials whose arrangement and extension are unknown, are made by scanning along perpendicular directions, or along a grid of measurement points. This operation is long and laborious, but it is imposed by the need to identify hidden objects whose direction is not known or determinable a priori. A GPR is, in fact, able to detect the immersed objects with so much more accuracy the more their position is close to the perpendicular with respect to the scanning direction.

For GPR equipment along the aforementioned predetermined directions, there are real-time assisting systems for performing these scans. They are based on the GPS location of the device, or on the distance and angle measurement between the GPR and a station capable of emitting a laser beam (total station). The latter requires a radio link between the total station and the GPR for the communication of the instantaneous position; moreover, there must not be any obstacle between the GPR and the laser source that can interrupt the line of sight.

However, GPS tracking is not available within buildings. The localization through total station, instead, is complex above all because the optical beam can be obstructed by the presence of the same GPR operator.

As an alternative to these methods, the prior art provides the use of sheets of limited extension to be affixed on the surface of the material to be investigated and showing the trajectories to be performed during the GPR scan; these devices, however, allow the operator to have no control over the correctness of the trajectory performed and they are therefore not very effective.

The position of the identified objects is then manually shown on the sheet of paper, in order to identify areas where it is possible to drill safely, possibly piercing the same sheet; the accuracy of location is therefore decidedly poor.

Document WO/2003/062860 describes a positioning system based on a mat provided with a plurality of projections and able to ensure the accurate execution of profiles along a single direction; this solution, however, does not allow perpendicular scanning and it is not practical if the scans must be made on a vertical wall. Furthermore, the position of the detected objects can not be represented on this mat.

In document JPS6193969 a device is described for detecting the position of a subterranean substance comprising a self-propelled carriage, a sensor for detecting the substance in ground and a distance sensor for determining the position of the substance, once recovered, with respect to a fixed obstacle.

However, this device does not allow tracking the position of the carriage in real time, increasing the probability of deviating from the trajectory to be scanned and, consequently, reducing the probability of obtaining an accurate GPR image.

SUMMARY OF THE INVENTION

It is therefore a feature of the present invention to provide a method for detecting the position of objects under a surface that allows a detection of the objects in an absolute reference system without the aid of a GPS system.

It is also an object of the present invention to provide such a method that allows to easily store the information collected making it available for subsequent scans.

It is also a feature of the present invention to provide a system for implementing this method.

These and other objects are achieved by a method for detecting the position of objects under a surface with respect to a reference Cartesian system $S(x,y)$ having origin $O(0,0)$ and axes x and y, said method comprising the steps of:
  prearranging a GPR apparatus, said GPR apparatus comprising:
    a GPR sensor;
    a distance detecting unit configured to measure a distance with respect to a not transparent object;
    a control unit;
    a centre of reference $C(x_c, y_c)$ having coordinates $x_c$ and $y_c$ on the reference Cartesian system $S(x,y)$;
  prearranging a first linear wall, said first wall having direction parallel to the axis x of the reference Cartesian system $S(x,y)$;
  handling the GPR apparatus on the surface along a trajectory $\gamma$;
  detecting a first measurement of distance between the distance detecting unit and the first linear wall;
  processing the first measurement of distance by means of the control unit in order to calculate the coordinate $y_c$ of the centre of reference $C(x_c, y_c)$;
  repeating the steps of detecting and processing said first measurement of distance at time intervals $\tau$ in order to calculate a change of the coordinate $y_c$ during the step of handling;
  associating a coordinate $y_i = y_{ci}$ to an i-th object detected, where $y_{ci}$ is value of the coordinate $y_c$ at the detection by the GPR sensor of the i-th object;
  whose main feature is that it also comprises the steps of:

verifying, on the basis of the change of the coordinate $y_c$, that the trajectory γ coincides with a predetermined trajectory γ';

in case that the step of verifying is negative, correcting the trajectory γ along which is carried out the step of handling.

This way, it is possible to know in real time a coordinate of the centre $C(x_c,y_c)$. If the direction of handling of the apparatus is known, the other coordinate of $C(x_c,y_c)$ can also be calculated. Therefore, the position of each object can be detected in real time with respect to the reference system.

Advantageously, are also provided the steps of:

prearranging a second linear wall, said second wall having direction parallel to the axis y of the reference Cartesian system S(x,y);

detecting a second measurement of distance between the distance detecting unit and the second linear wall;

processing the second measurement of distance by means of the control unit in order to calculate the coordinate $x_c$ of the centre of reference $C(x_c,y_c)$;

repeating the steps of detecting and processing said second measurement of distance at time intervals τ in order to calculate a change of the coordinate $x_c$ during the step of handling;

associating a coordinate $x_i=x_{ci}$ to an i-th object detected, where $x_{ci}$ is value of the coordinate $x_c$ at the detection by the GPR sensor of the i-th object.

This way, it is possible to know in real time both the coordinates of the centre $C(x_c,y_c)$ even not knowing the direction of handling the apparatus.

In particular, the distance detecting unit comprises at least one laser sensor arranged to determine the first measurement of distance with respect to the first linear wall and/or the second measurement of distance with respect to the second linear wall by means of the difference between the transmission time and the receiving time of a laser pulse.

Advantageously, the first wall and/or the second wall are coated with a reflective material arranged to provide a higher precision in the reflection of the laser pulse.

In particular, the reflective material is a material diffusive of the laser, for example a reflector.

Advantageously, are also provided the steps of:

overlapping a marker at a predetermined point $P_k$ having coordinates $(x_k,y_k)$ with respect to the reference Cartesian system S(x,y), said marker arranged to contain information about the coordinates $(x_k,y_k)$ and about possible objects measured near the predetermined point $P_k$;

acquiring the information contained in the marker by a reader;

use of the information obtained to display, by a software of augmented reality, the possible objects detected overlapped to the surface.

According to another aspect of the invention, it is claimed a system for detecting the position of objects under a surface with respect to a reference Cartesian system S(x,y) having origin $O(x_0,y_0)$ and axes x and y, said system comprising:

a GPR apparatus comprising
 a GPR sensor;
 a control unit;
 a centre of reference $C(x_c,y_c)$ having coordinates $x_c$ and $y_c$ on the reference Cartesian system S(x,y);
 a first linear wall, said first wall having direction parallel to the axis x of the reference Cartesian system S(x,y);
 a second linear wall, said second wall (130) having direction parallel to the axis y of the reference Cartesian system S(x,y);

a distance detecting unit arranged for:
 detecting a first measurement of distance between the distance detecting unit and the first linear wall;
 detecting a second measurement of distance between the distance detecting unit and the second linear wall;

said control unit arranged to carry out:
 a processing of the first and of the second measurement of distance in order to calculate the coordinates $x_c$ and $y_c$ of the centre of reference $C(x_c,y_c)$;
 an association of coordinates $x_i=x_{ci}$ and $y_i=y_{ci}$ to an i-th object detected, where $x_{ci}$ and $y_{ci}$ are the values of the coordinates $x_c$ and $y_c$ at the detection by the GPR sensor of the i-th object;

whose main feature is that the control unit is also arranged for:
 verifying, on the basis of said change said coordinate $y_c$, that said trajectory γ coincides with a predetermined trajectory γ';
 in case that said step of verifying is negative, correcting said trajectory γ along which is carried out said step of handling.

Advantageously, the distance detecting unit comprises at least one laser sensor arranged to determine the first measurement of distance with respect to the first linear wall and/or the second measurement of distance with respect to the second linear wall by the difference between the transmission time and the receiving time of a laser pulse.

In particular, the distance detecting unit comprises 4 laser sensors configured so that laser pulses are sent at 90° from each other.

Advantageously, an angular sensor is also provided configured to measure an angular variation of the GPR apparatus with respect to the reference Cartesian system S(x,y) and to provide the angular variation to the control unit.

In this way, if the apparatus does not move in a straight line, the control unit can identify the coordinates of the centre by knowing the angular variation with respect to the initial position and applying simple trigonometric calculations.

Advantageously, the distance detecting unit is adapted to rotate on itself in order to keep fixed its own angular orientation with respect to the reference Cartesian system S(x,y).

This way, the laser pulses are always perpendicular to the linear walls, even if the apparatus rotates, improving, thus the measurement accuracy.

According to a further aspect of the invention, is rivendica a system for detecting the position of objects under a surface with respect to a reference Cartesian system S(x,y) having origin $O(x_0,y_0)$ and axes x and y using a GPR apparatus (110), said GPR apparatus comprising:

a GPR sensor;
a control unit;
a centre of reference $C(x_c,y_c)$ having coordinates $x_c$ and $y_c$ on the reference Cartesian system S(x,y);

said system comprising:
 a first linear wall, said first wall having direction parallel to the axis x of the reference Cartesian system S(x,y);
 a second linear wall, said second wall (130) having direction parallel to the axis y of the reference Cartesian system S(x,y);

whose main feature is of comprising also a distance detecting unit located on board of the GPR apparatus, said distance detecting unit arranged for:

detecting a first measurement of distance between the distance detecting unit and the first linear wall;

detecting a second measurement of distance between the distance detecting unit and the second linear wall;

and that the control unit is adapted to carry out:

a processing of the first and of the second measurement of distance in order to calculate the coordinates $x_c$ and $y_c$ of the centre of reference $C(x_c,y_c)$;

an association of coordinates $x_i=x_{ci}$ and $y_i=y_{ci}$ to an i-th object detected, where $x_{ci}$ and $y_{ci}$ are the values of the coordinates $x_c$ and $y_c$ at the detection by the GPR sensor of the i-th object.

BRIEF DESCRIPTION OF THE DRAWINGS

Further characteristic and/or advantages of the present invention are more bright with the following description of an exemplary embodiment thereof, exemplifying but not limitative, with reference to the attached drawings in which.

DESCRIPTION OF A PREFERRED EXEMPLARY EMBODIMENT

With reference to FIGS. 1, 2, 3 and 4, in a preferred exemplary embodiment, the method for detecting the position of objects 10 under a surface 200 with respect to a reference Cartesian system S(x,y) comprises a first step of prearranging a GPR apparatus 110 [301].

Figure 1:
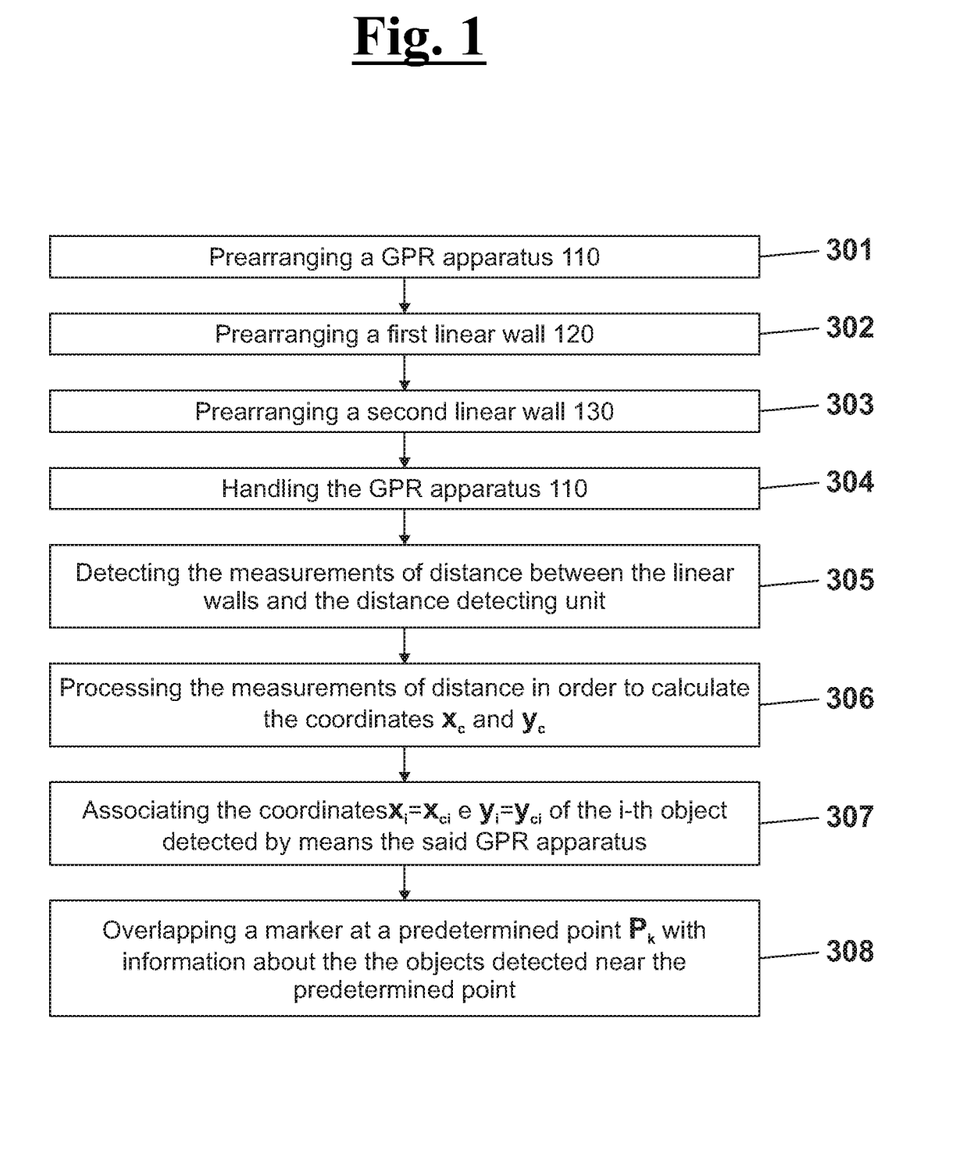
FIG. 1 shows a flow-sheet of the method for detecting the position of objects under a surface, according to the present invention.
Figure 2:
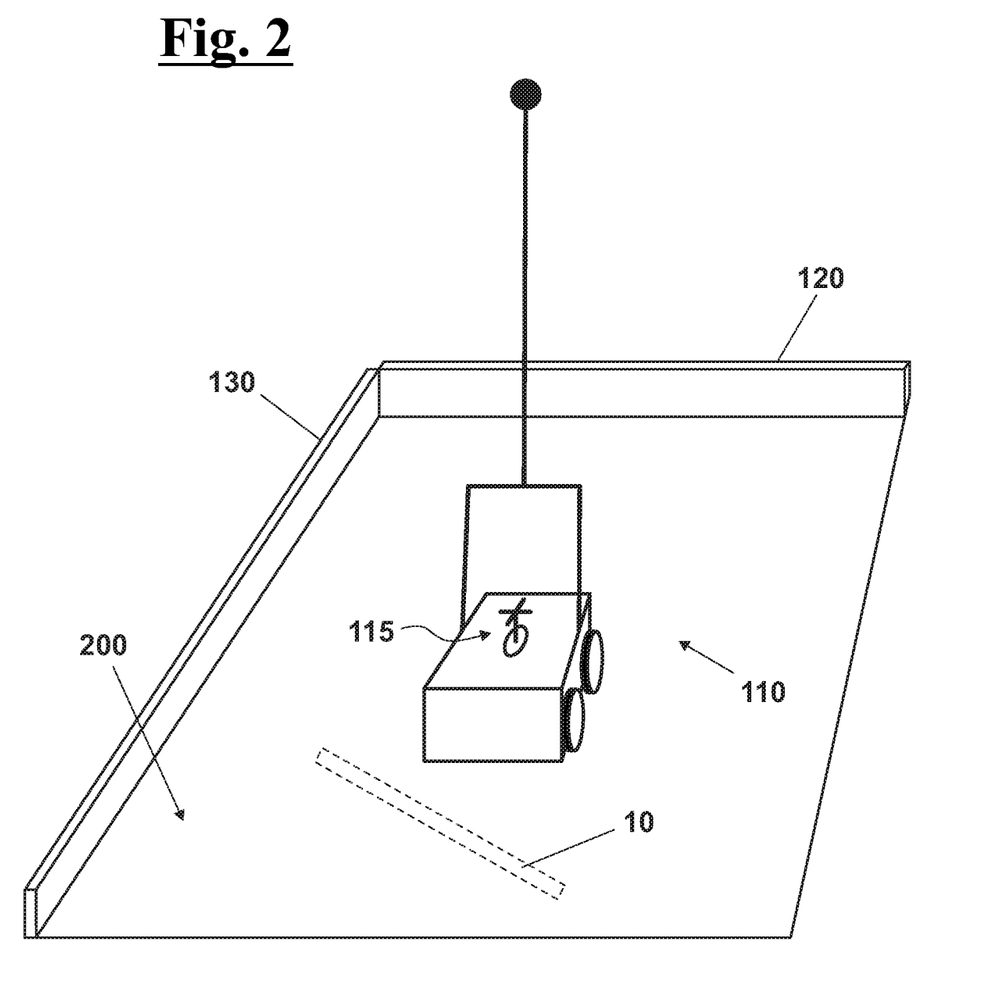
FIG. 2 shows a perspective view of a system for detecting the position of objects under a surface, according to the present invention.

In particular, with reference to FIG. 2, the apparatus 110 comprises a GPR sensor, a distance detecting unit 115 and a control unit. With reference even at FIG. 3, the apparatus 110 also comprises a centre of reference $C(x_c,y_c)$ having coordinates $x_c$ and $y_c$ on the reference Cartesian system S(x,y).

Figure 3:
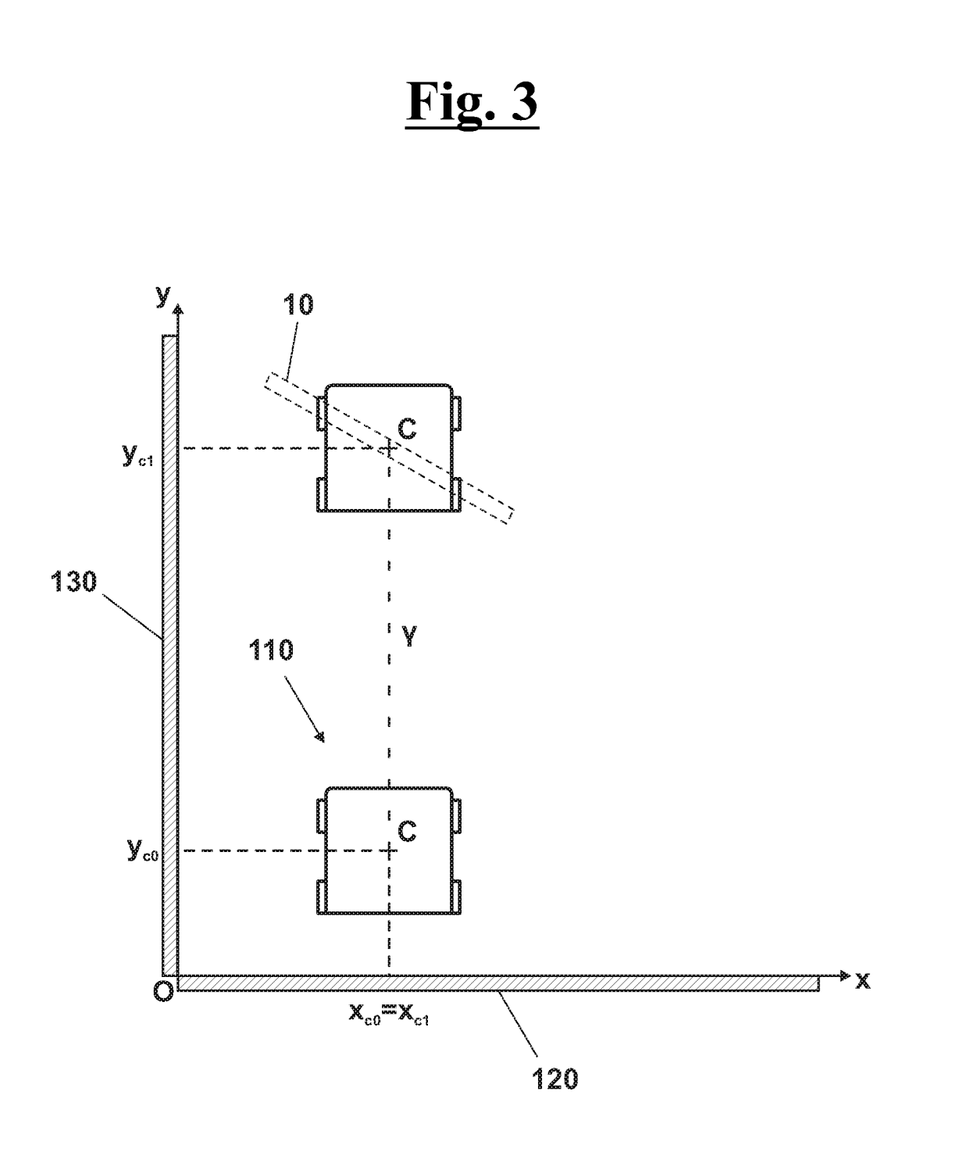
FIG. 3 shows in view from above a first possible scanning of the surface.
Figure 4:
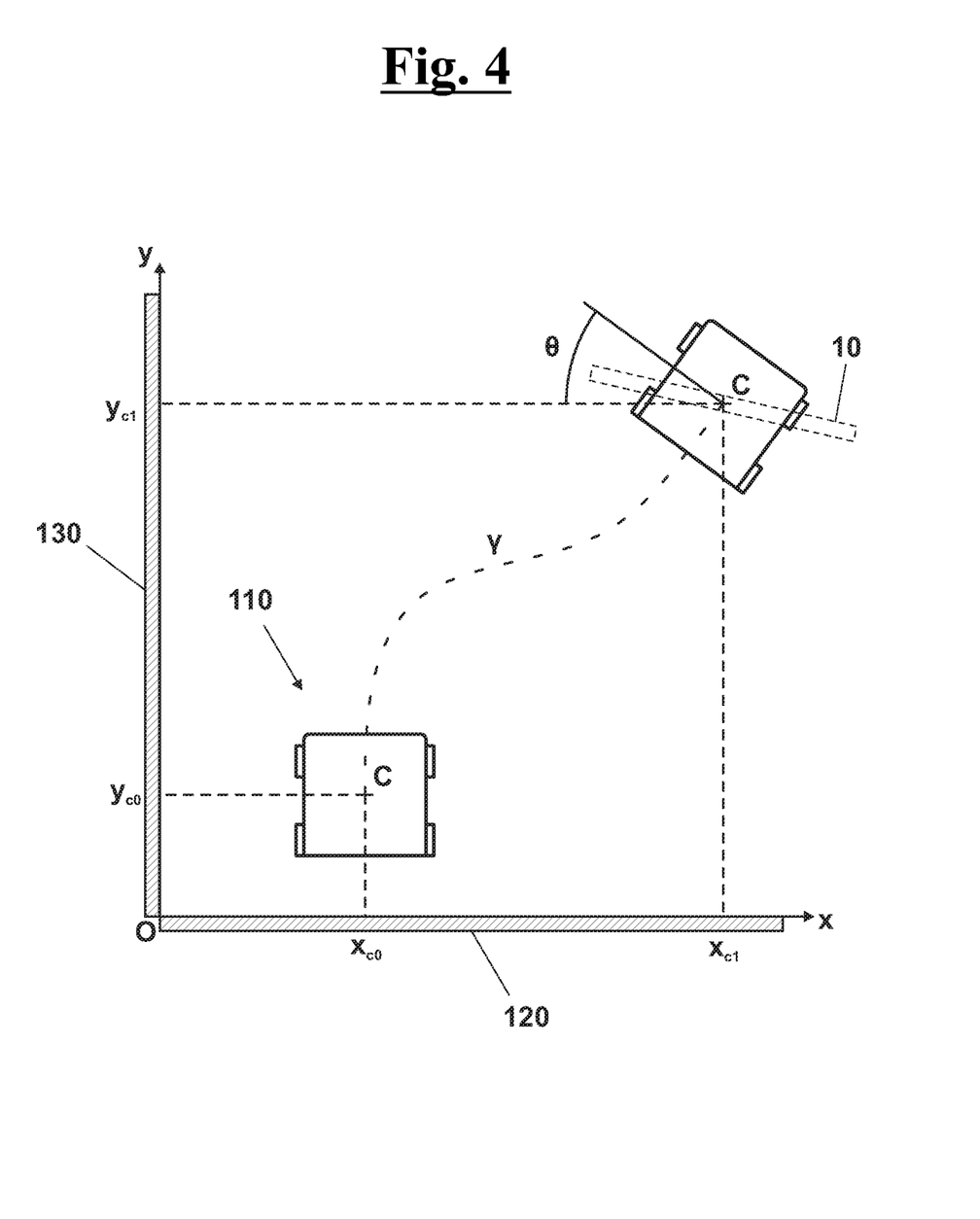
FIG. 4 shows in view from above a second possible scanning of the surface.

The method provides then a step of prearranging a first linear wall 120 parallel to the axis x [302] and a second linear wall 130 parallel to the axis y [303]. Such walls 120, 130 are preferably coated with reflective material, for example a reflector. In particular, it is possible both using walls already present in loco, or removable set squares designed for the use.

The method therefore provides, starting from a known position on the surface 200, the movement of the apparatus 100 [304] for carrying out, by means of the GPR sensor, the search for objects 10 underground to the surface itself.

In the next step, the distance detecting unit 115 carries out a detection of the distance measurements with respect to the two rectilinear walls 120, 130 [305]. This operation can be carried out at regular intervals both with the apparatus 110 stationary and during the scan.

The distance detecting unit 115 can for example comprise two laser sensors located perpendicularly to each other and oriented towards the walls 120, 130. Alternatively, the distance detecting unit 115 can comprise 4 laser sensors perpendicular to each other, in order to detect the measurement distance, irrespective of the direction the apparatus 110, with respect to the walls 120, 130.

In an exemplary embodiment the distance detecting unit 115 can rotate on itself for orienting suitably with respect to the walls 120, 130. In this case, a single laser sensor can be provided configured to measure both the measurement distances.

The method then provides a step of processing, by the control unit, the measurement distance detected in order to calculate the coordinates of the centre $C(x_c,y_c)$. [306]

When an underground object 10 is detected, the control unit proceeds then to associate the coordinates of the centre $C(x_{ci},y_{ci})$ at the detection with the coordinates $x_i,y_i$ of the object 10 detected. [307]

Finally, a marker can be placed at a predetermined point $P_k$ having coordinates $(x_k,y_k)$ with respect to the reference Cartesian system S(x,y). The marker contains information both on the coordinates $(x_k,y_k)$, both on the objects 10 present near the point $P_k$. The marker can be, for example, a QR Code. This way, it is possible to use an electronic device, such as a smartphone or a tablet having an application arranged for augmented reality, for detecting the information contained in the marker and display the objects measured 10 virtually overlapped on the surface 200. It is therefore possible to archive the information on the objects 10 under the surface 200 and consult them in augmented reality whenever necessary.

In the case of FIG. 3, the apparatus 110 has to move parallel to the axis y. The control unit must then to control that, in the light of the measurement distance detected with respect to the wall 130, the coordinate $x_c$ of the centre C is maintained fixed whereas the coordinate $y_c$ increases progressively. When the object 10 is detected, the coordinates $x_{c1},y_{c1}$ of the centre C are then identified with the coordinates $x_i,y_i$ of the object itself.

In the case of FIG. 4, instead, the apparatus 110 moves arbitrarily, also changing its own direction. To allow movements of this kind, in a further exemplary embodiment of the invention, the distance detecting unit 115 comprises an angular sensor arranged to adjust the angular variation θ of the GPR apparatus 110 with respect to the reference system S(x,y). The angular sensor can be for example a gyroscope, a gyrocompass or an accelerometer.

In case that the distance detecting unit 115 is integral to the apparatus 110, the measurement distance detected will not be detected in a way perpendicular to the walls 120, 130. In this case, by knowing the angle θ the control unit can apply easy trigonometric calculations to derive the coordinates $x_c,y_c$.

In case, instead, that the distance detecting unit 115 can rotate with respect to apparatus 110, the control unit can operate a thereof rotation in a direction which is opposite to the rotation θ made by the apparatus 110, so that the measurement distance are detected in a direction perpendicular to the walls 120, 130 providing directly the coordinates $x_c,y_c$.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:

1. A method for detecting positions of objects under a surface with respect to a reference Cartesian system S(x, y) having origin O(0,0) and axes x and y, said method comprising the steps of:
   prearranging a GPR apparatus, said GPR apparatus comprising:
      a GPR sensor;
      a distance detecting unit configured to measure a distance with respect to a non-transparent object;
      a control unit; and
      a center of reference $C(x_c, y_c)$ having coordinates $x_c$ and $y_c$ on said reference Cartesian system S(x, y);
   prearranging a first linear wall, said first wall having direction parallel to said axis x of said reference Cartesian system S(x, y);
   handling said GPR apparatus on said surface along a trajectory γ;
   detecting, by means of said distance detecting unit, a first measurement of distance between said distance detecting unit and said first linear wall;
   processing said first measurement of distance by means of said control unit in order to calculate said coordinate $y_c$ of said center of reference $C(x_c, y_c)$;
   prearranging a second linear wall, said second wall having direction parallel to said axis y of said reference Cartesian system S(x, y);
   detecting, by means of said distance detecting unit, a second measurement of distance between said distance detecting unit and said second linear wall;
   processing said second measurement of distance by means of said control unit in order to calculate said coordinate $x_c$ of said center of reference $C(x_c, y_c)$;
   repeating, by means of said distance detecting unit, said steps of detecting and processing said first measurement of distance at time intervals τ in order to calculate a change of said coordinate $y_c$ during said step of handling;
   associating a coordinate $y_i=y_{ci}$ to an i-th object detected, where $y_{ci}$ is value of said coordinate $y_c$ at the detection by said GPR sensor of said i-th object;
   repeating, by means of said distance detecting unit, said steps of detecting and processing said second measurement of distance at time intervals r in order to calculate a change of said coordinate $x_c$ during said step of handling;
   associating a coordinate $x_i=x_{ci}$ to an i-th object detected, where $x_{ci}$ is the value of said coordinate $x_c$ at the detection by said GPR sensor of said i-th object;
   verifying, on the basis of said change of said coordinates $x_c$ and $y_c$, that said trajectory γ coincides with a predetermined trajectory γ'; and
   in case that said step of verifying is negative, correcting said trajectory γ along which is carried out said step of handling, by means of said distance detecting unit.

2. The method for detecting positions of objects under a surface, according to claim 1, wherein said distance detecting unit comprises at least one laser sensor arranged to determine said first measurement of distance with respect to said first linear wall and/or said second measurement of distance with respect to said second linear wall by means of the difference between the transmission time and the receiving time of a laser pulse.

3. The method for detecting positions of objects under a surface, according to claim 2, wherein said first wall and/or said second wall are coated with a reflective material arranged to provide a higher precision in the reflection of said laser pulse.

4. The method for detecting positions of objects under a surface, according to claim 1, further comprising:
   overlapping a marker at a predetermined point $P_k$ having coordinates $(x_k, y_k)$ with respect to said reference Cartesian system S(x,y), said marker arranged to contain information about said coordinates $(x_k, y_k)$ and about possible objects detected near said predetermined point $P_k$;
   acquiring said information contained in said marker by a reader; and
   use of said information obtained to display, by a software of augmented reality, said possible objects detected overlapped to said surface.

5. A system for detecting positions of objects under a surface with respect to a reference Cartesian system S(x, y) having origin $O(x_o, y_o)$ and axes x and y, said system comprising:
   a GPR apparatus comprising:
      a GPR sensor;
      a control unit; and
      a center of reference $C(x_c, y_c)$ having coordinates $x_c$ and $y_c$ on said reference Cartesian system S(x, y);
   a first linear wall, said first wall having direction parallel to said axis x of said reference Cartesian system S(x, y);
   a second linear wall, said second wall having direction parallel to said axis y of said reference Cartesian system S(x, y); and
   a distance detecting unit arranged for:
      detecting a first measurement of distance between said distance detecting unit and said first linear wall; and
      detecting a second measurement of distance between said distance detecting unit and said second linear wall; and
   said control unit arranged to carry out:
      a processing of said first and second measurement of distance in order to calculate said coordinates $x_c$ and $y_c$ of said center of reference $C(x_c, y_c)$;
      an association of coordinates $x_i=x_{ci}$ and $y_i=y_{ci}$ to an i-th object detected, where $x_{ci}$ and $y_{ci}$ are the values of said coordinates $x_c$ and $y_c$ at the detection by means of said GPR sensor of said i-th object;
      verifying, on the basis of said change said coordinate $y_c$, that said trajectory γ coincides with a predetermined trajectory γ'; and
      in case that said step of verifying is negative, correcting said trajectory γ along which is carried out said step of handling.

6. The system for detecting positions of objects under a surface, according to claim 5, wherein said distance detecting unit comprises at least one laser sensor arranged to determine said first measurement of distance with respect to said first linear wall and/or said second measurement of distance with respect to said second linear wall by the difference between the transmission time and the receiving time of a laser pulse.

7. The system for detecting positions of objects under a surface, according to claim 6, wherein said distance detecting unit comprises four laser sensors configured so that laser pulses are sent along four directions parallel to a plane comprising said axes x and y and having angular intervals of 90°.

8. The system for detecting positions of objects under a surface, according to claim 5, wherein an angular sensor is also provided configured to measure an angular variation of said GPR apparatus with respect to said reference Cartesian system $S(x, y)$ and to provide said angular variation to said control unit.

9. A system for detecting positions of objects under a surface with respect to a reference Cartesian system $S(x, y)$ having origin $O(x_o, y_o)$ and axes x and y using a GPR apparatus, said GPR apparatus comprising:
   a GPR sensor;
   a control unit; and
   a center of reference $C(x_c, y_c)$ having coordinates $x_c$ and $y_c$ on said reference Cartesian system $S(x, y)$;
said system comprising:
   a first linear wall, said first wall having direction parallel to said axis x of said reference Cartesian system $S(x, y)$;
   a second linear wall, said second wall having direction parallel to said axis y of said reference Cartesian system $S(x, y)$; and
   a distance detecting unit comprising at least one laser sensor and located on board of said GPR apparatus, wherein:
      said distance detecting unit is arranged for:
         detecting a first measurement of distance between said distance detecting unit and said first linear wall, by a difference between the transmission time and the receiving time of a laser pulse; and
         detecting a second measurement of distance between said distance detecting unit and said second linear wall, by a difference between the transmission time and the receiving time of a second laser pulse; and
   said control unit is adapted to carry out:
      a processing of said first and second measurement of distance in order to calculate said coordinates $x_c$ and $y_c$ of said center of reference $C(x_c, y_c)$;
      an association of coordinates $x_i = x_{ci}$ and $y_i = y_{ci}$ to an i-th object detected, where $x_{ci}$ and $y_{ci}$ are the values of said coordinates $x_c$ and $y_c$ at the detection by said GPR sensor of said i-th object;
      verifying, on the basis of said change said coordinate $y_c$, that said trajectory $\gamma$ coincides with a predetermined trajectory $\gamma'$; and
      in case that said step of verifying is negative, correcting said trajectory $\gamma$ along which is carried out said step of handling.

\* \* \* \* \*